(12) United States Patent
Kim

(10) Patent No.: US 8,881,093 B2
(45) Date of Patent: Nov. 4, 2014

(54) APPARATUS AND METHOD FOR RECONSTRUCTING EMBEDDED SOFTWARE DEVELOPMENT ENVIRONMENT

(75) Inventor: Jeong-Si Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 270 days.

(21) Appl. No.: 13/295,325

(22) Filed: Nov. 14, 2011

(65) Prior Publication Data

US 2012/0124548 A1    May 17, 2012

(30) Foreign Application Priority Data

Nov. 16, 2010    (KR) .................. 10-2010-0114076

(51) Int. Cl.
*G06F 9/44*    (2006.01)
(52) U.S. Cl.
CPC ........................... *G06F 8/30* (2013.01)
USPC .......................................... 717/101
(58) Field of Classification Search
USPC .......................................... 717/101
See application file for complete search history.

(56) References Cited

U.S. PATENT DOCUMENTS

| 2004/0193639 | A1* | 9/2004 | Bergman et al. .......... 707/103 R |
| 2008/0134144 | A1* | 6/2008 | Nathan et al. ................. 717/121 |
| 2009/0228862 | A1 | 9/2009 | Bertelrud et al. |
| 2010/0070442 | A1* | 3/2010 | Kreuter .......................... 706/14 |
| 2011/0154285 | A1 | 6/2011 | Kim |

FOREIGN PATENT DOCUMENTS

KR    10-2011-0071474    6/2011

OTHER PUBLICATIONS

MDK-ARM Primer (p. 1-14, Aug. 2009, http://www.keil.com/support/man/docs/gsac/).*

* cited by examiner

*Primary Examiner* — Li B Zhen
*Assistant Examiner* — Hui-Wen Lin
(74) *Attorney, Agent, or Firm* — Staas & Halsey LLP

(57) ABSTRACT

Disclosed herein is a method and apparatus for reconstructing an embedded software development environment. The apparatus includes an integrated management setting unit and an integrated project management unit. The integrated management setting unit sets at least one target supported by each of a plurality of development tools and registers the plurality of development tools. The integrated project management unit creates an integrated project in which the embedded software development environment is reconstructed using the plurality of development tools.

8 Claims, 12 Drawing Sheets

APPARATUS AND METHOD FOR RECONSTRUCTING EMBEDDED SOFTWARE DEVELOPMENT ENVIRONMENT

CROSS REFERENCE TO RELATED APPLICATION

This application claims the benefit of Korean Patent Application No. 10-2010-0114076, filed on Nov. 16, 2010, which is hereby incorporated by reference in its entirety into this application.

BACKGROUND OF THE INVENTION

1. Technical Field

The present invention relates generally to an apparatus and method for reconstructing an embedded software development environment and, more particularly, to an apparatus and method for reconstructing an embedded software development environment, which provides an embedded software developer with a development environment that enables the developer to rapidly develop embedded software by conveniently utilizing tools suitable for embedded system targets and projects appropriate for embedded software application characteristics.

2. Description of the Related Art

An embedded system refers to a system in which hardware and software have been combined so that predetermined tasks can be performed in a specific product or solution. For example, embedded systems may be installed in household electronic appliances, such as a refrigerator and a washing machine, automobiles, medical equipment, and communication equipment.

Meanwhile, an embedded system is not composed of only circuits, but further includes embedded software that performs a specific function using a microprocessor. For example, a washing machine may perform washing functionality while taking into account the type of clothing, the amount of clothing to be washed, the temperature of laundry water, etc. using embedded software.

In order to rapidly develop such embedded software, a variety of software development tools are being utilized. Since such software development tools cannot be applied to all types of embedded systems because of the characteristics of the embedded software development environment, a developer is required to make the additional effort of personally searching for, selecting and utilizing tools that support the embedded system to be developed.

Furthermore, existing software development tools manage developed software as project resources which are dependent on respective tools. Moreover, since pieces of embedded software that have a similar configuration are used when the application fields that embedded systems provide are similar to each other, it is common for embedded software to be developed by modifying previously developed embedded software that falls within the field of the related application.

However, when developers utilize software development tools, there is the inconvenience that they should manually determine the details of created projects for respective development tools and then utilize them.

SUMMARY OF THE INVENTION

Accordingly, the present invention has been made keeping in mind the above problems occurring in the prior art, and an object of the present invention is to provide an apparatus and method for reconstructing an embedded software development environment, which enables a software development tool, which is selected from among various software development tools and is suitable for an embedded system to be developed, to be easily utilized.

In accordance with an aspect of the present invention provides, there is provided a method of reconstructing an embedded software development environment, including receiving a project property; receiving a development type, corresponding to the project property, which is selected from among a plurality of development types; creating an integrated project using the project property and the selected development type; and creating a subordinate project of the integrated project using a plurality of development tools.

In accordance with another aspect of the present invention provides, there is provided an apparatus for reconstructing an embedded software development environment, including an integrated management setting unit for setting respective targets supported by a plurality of development tools and registering the plurality of development tools; and an integrated project management unit for creating an integrated project in which the embedded software development environment has been reconstructed using the plurality of development tools.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
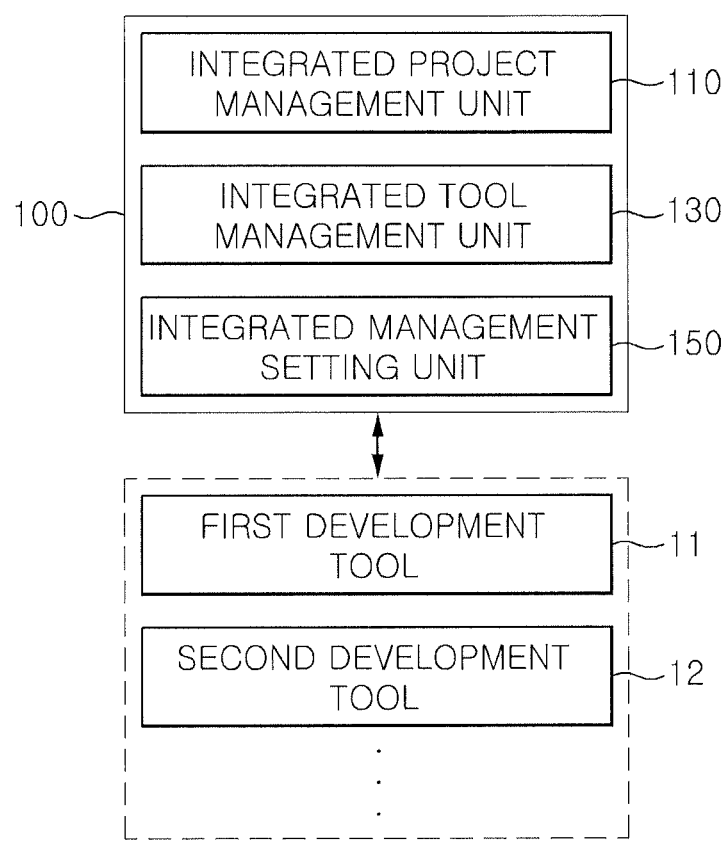
FIG. 1 is a diagram depicting one exemplary embodiment of an apparatus for reconstructing an embedded software development environment according to the present invention.

Reference now should be made to the drawings, in which the same reference numerals are used throughout the different drawings to designate the same or similar components.

The present invention will be described in detail with reference to the accompanying drawings. Here, repetitive descriptions and descriptions of known functions and constructions which have been deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated to make the description clear.

An apparatus and method for reconstructing an embedded software development environment according to an embodiment of the present invention will be described in detail below with reference to the accompanying drawings.

First, referring to FIG. 1, the apparatus 100 for reconstructing an embedded software development environment according to the embodiment of the present invention will be described.

FIG. 1 is a diagram depicting one exemplary embodiment of the apparatus 100 for reconstructing an embedded software development environment according to the present invention.

As shown in FIG. 1, the apparatus 100 for reconstructing an embedded software development environment is an apparatus for reconstructing an embedded software development environment using a plurality of software development tools, and includes an integrated project management unit 110, an integrated tool management unit 130, and an integrated management setting unit 150. Here, the plurality of software development tools is development tools for developing embedded software, and may include a first development tool 11 and a second development tool 12.

The integrated project management unit 110 creates an integrated project for reconstructing an embedded software development environment, and provides an interface between the integrated project and a user to provide the created integrated project to the user.

The integrated tool management unit 130 defines a development type for a target type and an application type for a project.

The integrated management setting unit 150 sets a target, that is, an embedded system, supported by each software development tool and registers the target type of the software development tool. Here, the integrated management setting unit 150 may configure software development tools, supporting respective target types, using the respective registered target types of the plurality of software development tools.

Next, referring to FIG. 2, the integrated project management unit of the apparatus for reconstructing an embedded software development environment according to the embodiment of the present invention will be described.

Figure 2:
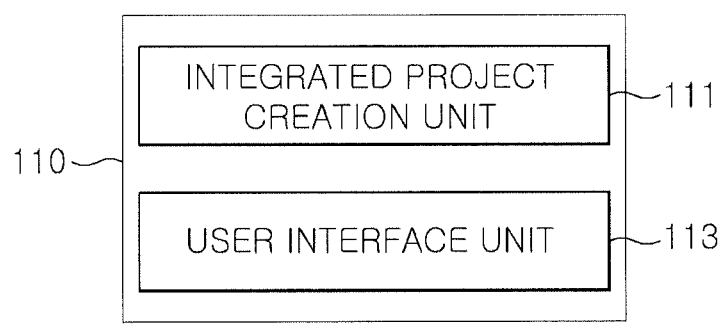
FIG. 2 is a diagram depicting one exemplary embodiment of an integrated project management unit.

FIG. 2 is a diagram depicting one exemplary embodiment of the integrated project management unit.

As shown in FIG. 2, the integrated project management unit 110 includes an integrated project creation unit 111 and a user interface unit 113.

The integrated project creation unit 111 sets project properties so as to create an integrated project, sets a development type in accordance with the set project properties, and creates an integrated project corresponding to the set project properties and development type. Here, the project properties include an application type and a target type. Furthermore, the integrated project creation unit 111 may add a subordinate project to the created integrated project.

The user interface unit 113 displays the created integrated project, and provides an interface between the integrated project and the user.

Next, the integrated tool management unit of the apparatus for reconstructing an embedded software development environment according to the embodiment of the present invention will be described with reference to FIG. 3.

Figure 3:
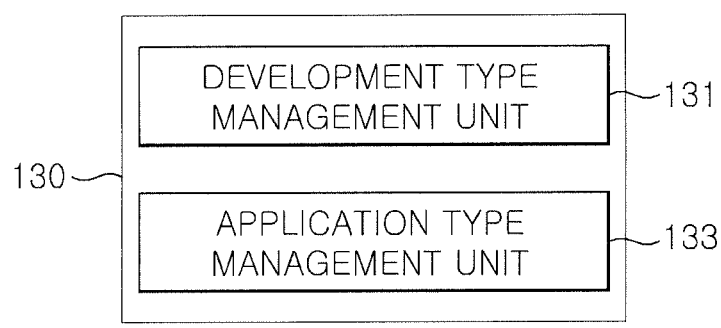
FIG. 3 is a diagram depicting one exemplary embodiment of an integrated tool management unit.

FIG. 3 is a diagram depicting one exemplary embodiment of the integrated tool management unit.

As shown in FIG. 3, the integrated tool management unit 130 includes a development type management unit 131 and an application type management unit 133.

The development type management unit 131 defines and amends a development type for a registered target type.

The application type management unit 133 defines and amends an application type for a project.

Next, a method for the integrated management setting unit to register the target type of a software development tool according to an embodiment of the present invention will be described with reference to FIG. 4.

Figure 4:
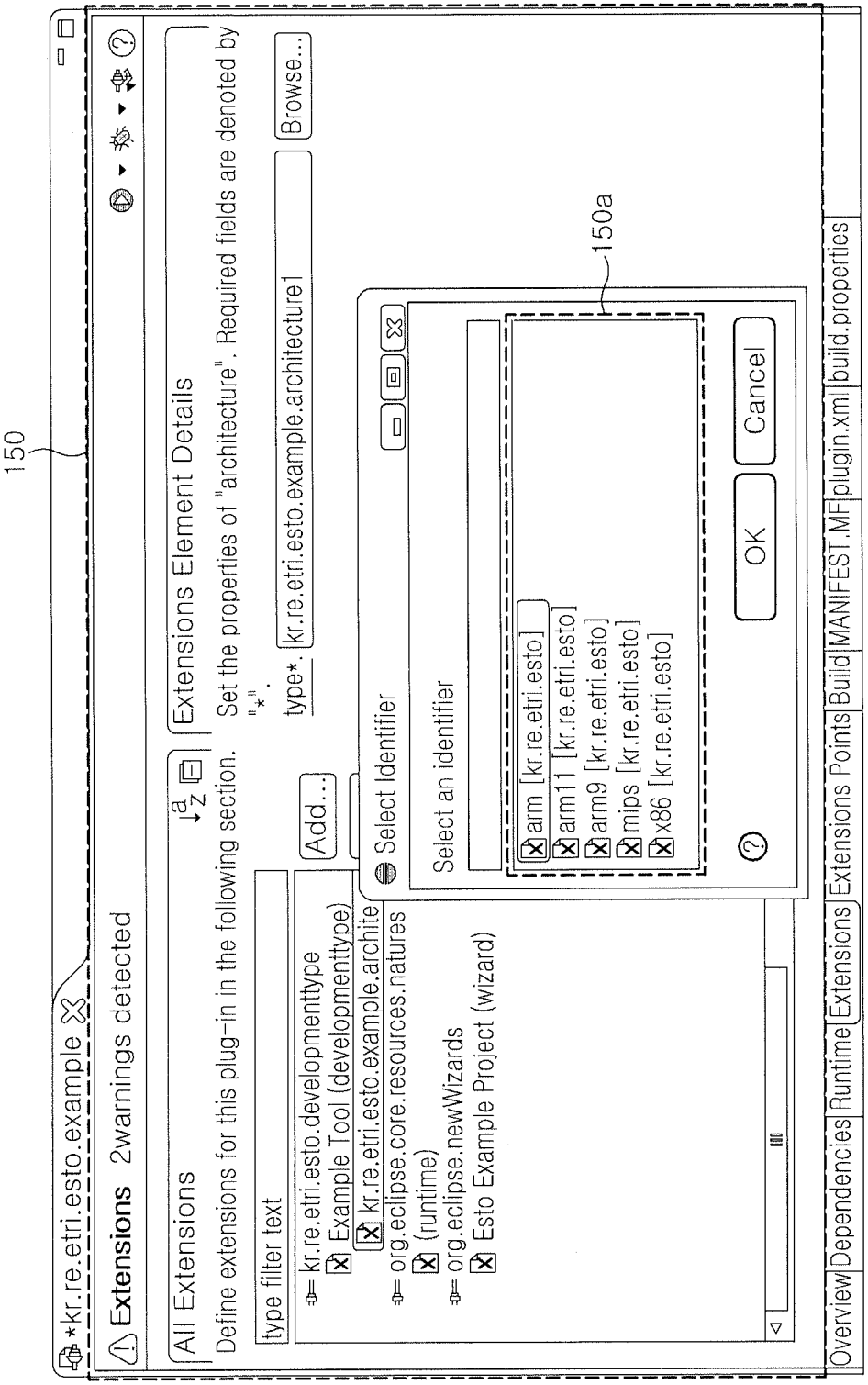
FIG. 4 is a diagram depicting a method of registering a target type according to an embodiment of the present invention.

FIG. 4 is a diagram depicting the method of registering a target type according to the embodiment of the present invention.

As shown in FIG. 4, the integrated management setting unit 150 may register a target type that is supported by the software development tool.

For example, the integrated management setting unit 150 may register any one of a plurality of target types 150a, that is, "arm," "arm11," "arm9," "mips," and "x86," as the target type of the first development tool 11.

Next, a method for the development type management unit of the integrated tool management unit to define a development type for a target type according to an embodiment of the present invention will be described with reference to FIG. 5.

Figure 5:
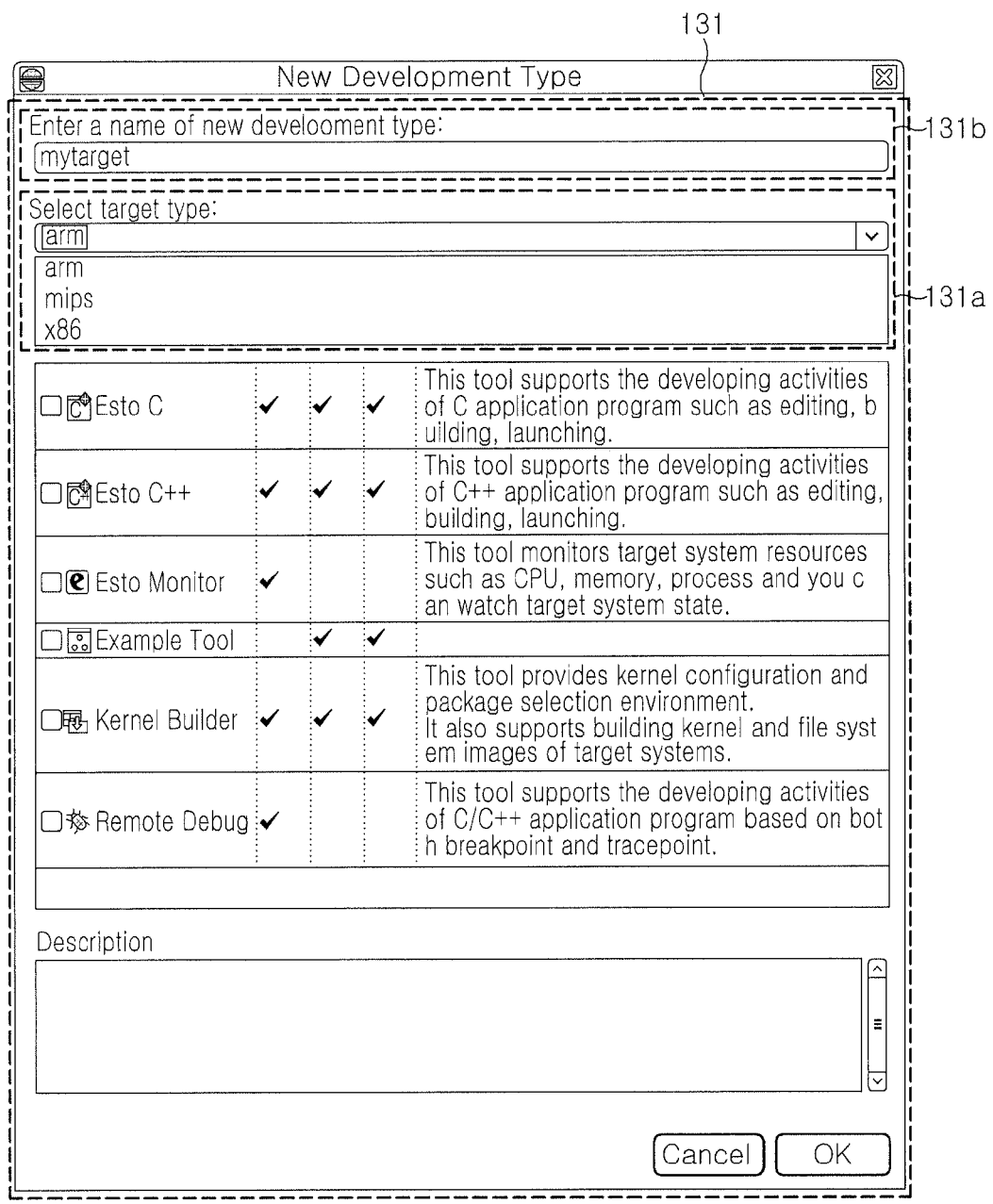
FIG. 5 is a diagram depicting a method of defining a development type according to an embodiment of the present invention.

FIG. 5 is a diagram depicting the method of defining a development type according to the embodiment of the present invention.

As shown in FIG. 5, the development type management unit 131 may define a development type for a target type.

For example, the development type management unit 131 may define a development type 131b for any one of a plurality of target types 131a, that is, "arm", "mips," and "x86," as "mytarget."

Next, a method for the application type management unit of the integrated tool management unit to define an application type according to an embodiment of the present invention will be described with reference to FIG. 6.

Figure 6:
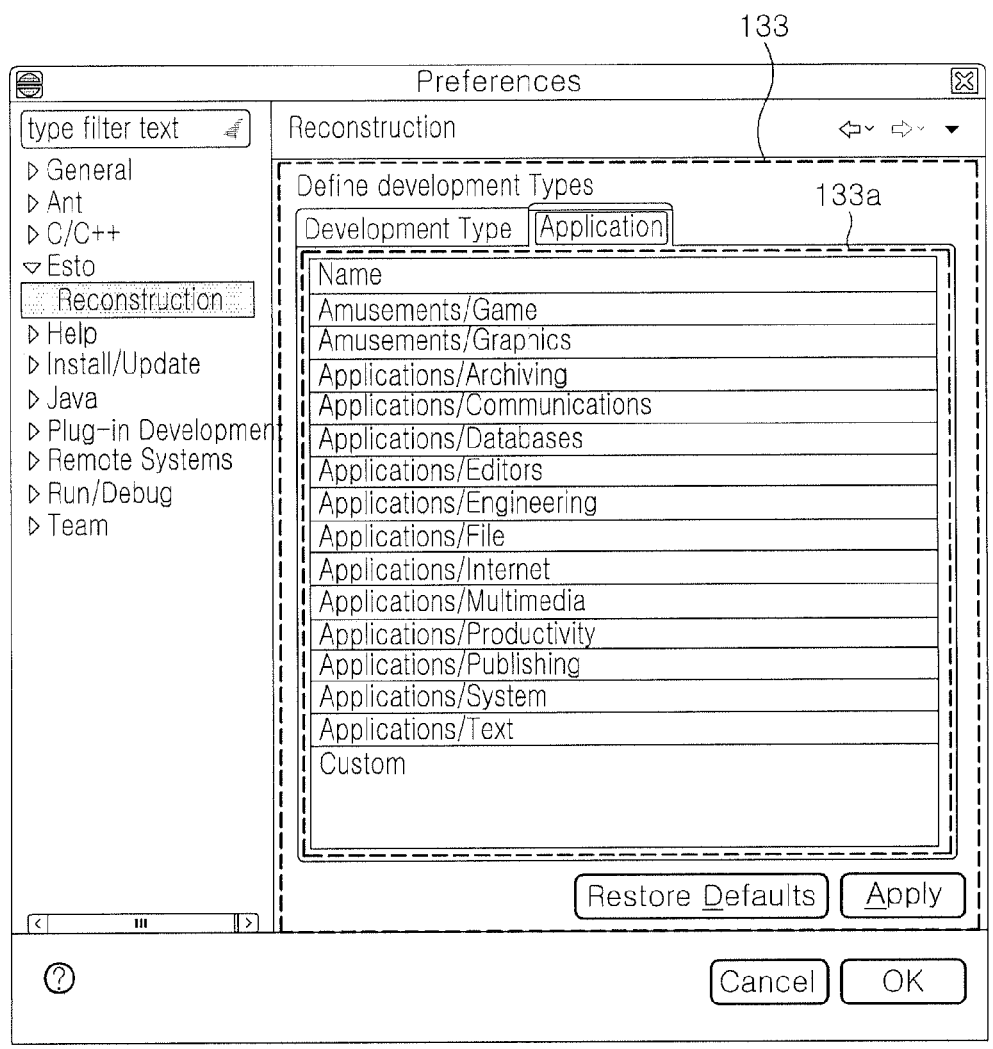
FIG. 6 is a diagram depicting a method of defining an application type according to an embodiment of the present invention.

FIG. 6 is a diagram depicting the method of defining an application type according to the embodiment of the present invention.

As shown in FIG. 6, the application type management unit 133 may define an application type.

For example, the application type management unit 133 may define a plurality of application types 133a, that is, "Amusements/Games," "Amusements/Graphics," "Applications/Archiving," "Applications/Communications," "Applications/Databases," "Applications/Editors," "Applications/Engineering," "Applications/File," "Applications/Internet," "Applications/Multimedia," "Applications/Productivity," "Applications/Publishing," "Applications/System," "Applications/Text" and "Custom."

Next, a method for the apparatus for reconstructing an embedded software development environment to reconstruct an embedded software development environment and create an integrated project according to an embodiment of the present invention will be described with reference to FIG. 7.

Figure 7:
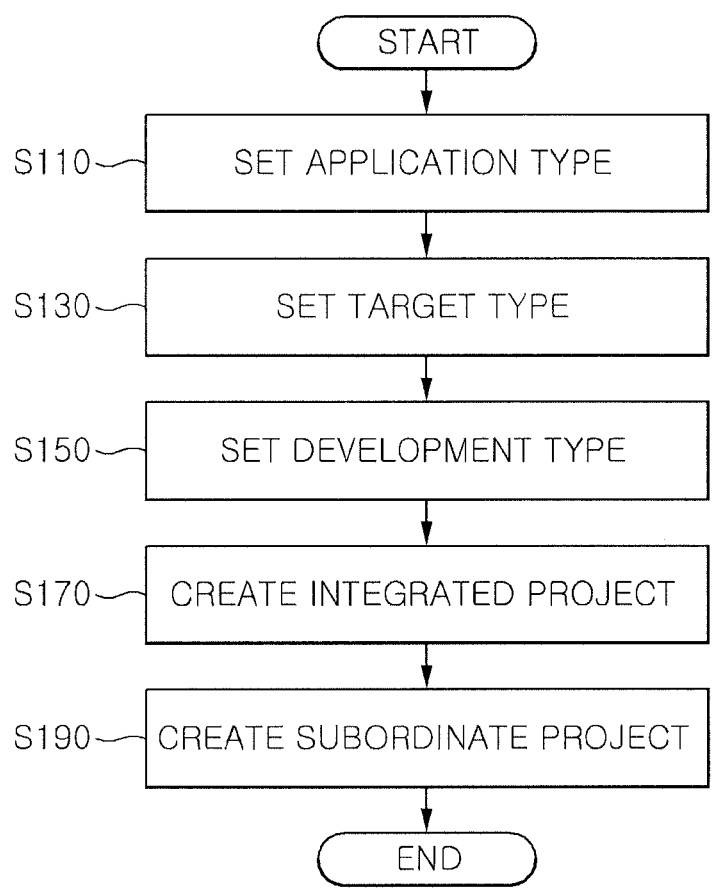
FIG. 7 is a diagram depicting a method of reconstructing an embedded software develop environment according to an embodiment of the present invention.

FIG. 7 is a diagram depicting the method of reconstructing an embedded software develop environment according to the embodiment of the present invention.

As shown in FIG. 7, first, the integrated project creation unit 111 of the integrated project management unit 110 sets the application type of a project property at step S110. Here, the integrated project creation unit 111 of the integrated project management unit 110 may receive an application type from a user, and set the application type of the project property.

Thereafter, the integrated project creation unit 111 of the integrated project management unit 110 sets the target type of the project property at step S130. Here, the integrated project creation unit 111 of the integrated project management unit 110 may receive a target type from a user, and set the target type of the project property.

Thereafter, the integrated project creation unit 111 of the integrated project management unit 110 selects any one of a plurality of development types corresponding to the set target type and sets the development type at step S150. Here, the integrated project creation unit 111 of the integrated project management unit 110 may receive any one of a plurality of development types, and set the development type.

Thereafter, the integrated project creation unit 111 of the integrated project management unit 110 creates an integrated project corresponding to the set application type, the target type and the development type at step S170.

Thereafter, the integrated project creation unit 111 of the integrated project management unit 110 creates a subordinate project of the created integrated project at step S190.

Next, the method for the integrated project creation unit of the integrated project management unit to set the application type of a project property according to an embodiment of the present invention will be described with reference to FIG. 8.

Figure 8:
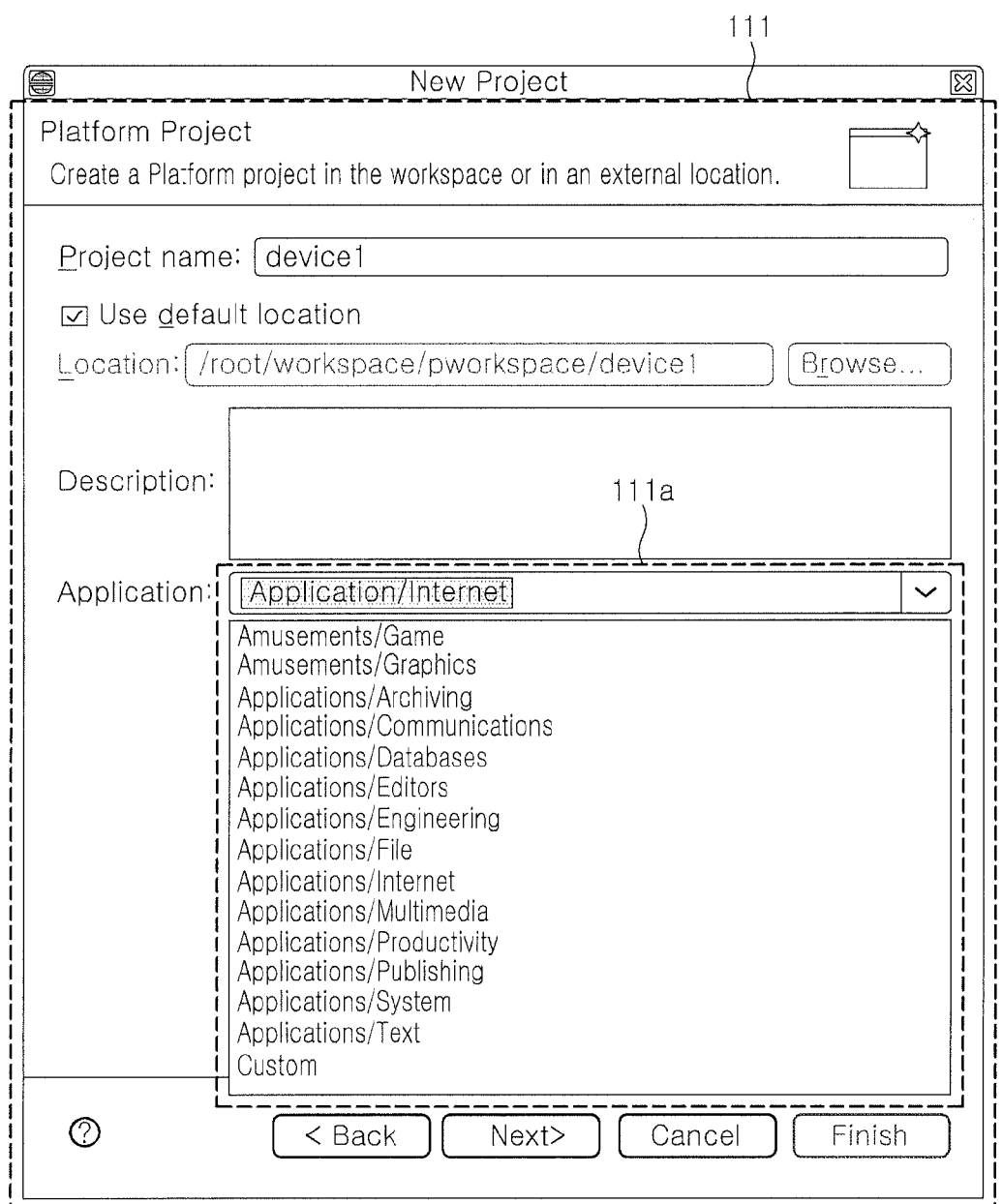
FIG. 8 is a drawing depicting a method of setting an application type according to an embodiment of the present invention.

FIG. 8 is a drawing depicting the method of setting an application type according to the embodiment of the present invention.

As shown in FIG. 8, the integrated project creation unit 111 may set the application type of the project property for a project to be created.

For example, the integrated project creation unit 111 may set any one of a plurality of predefined application types 111a, that is, "Amusements/Games," "Amusements/Graphics," "Applications/Archiving," "Applications/Communications," "Applications/Databases," "Applications/Editors," "Applications/Engineering," "Applications/File," "Applications/Internet," "Applications/Multimedia," "Applications/Productivity," "Applications/Publishing," "Applications/System," "Applications/Text," and "Custom" as the application type of a project property.

Next, a method for the integrated project creation unit of the integrated project management unit to set the target type of a project property according to an embodiment of the present invention will be described with reference to FIG. 9.

Figure 9:
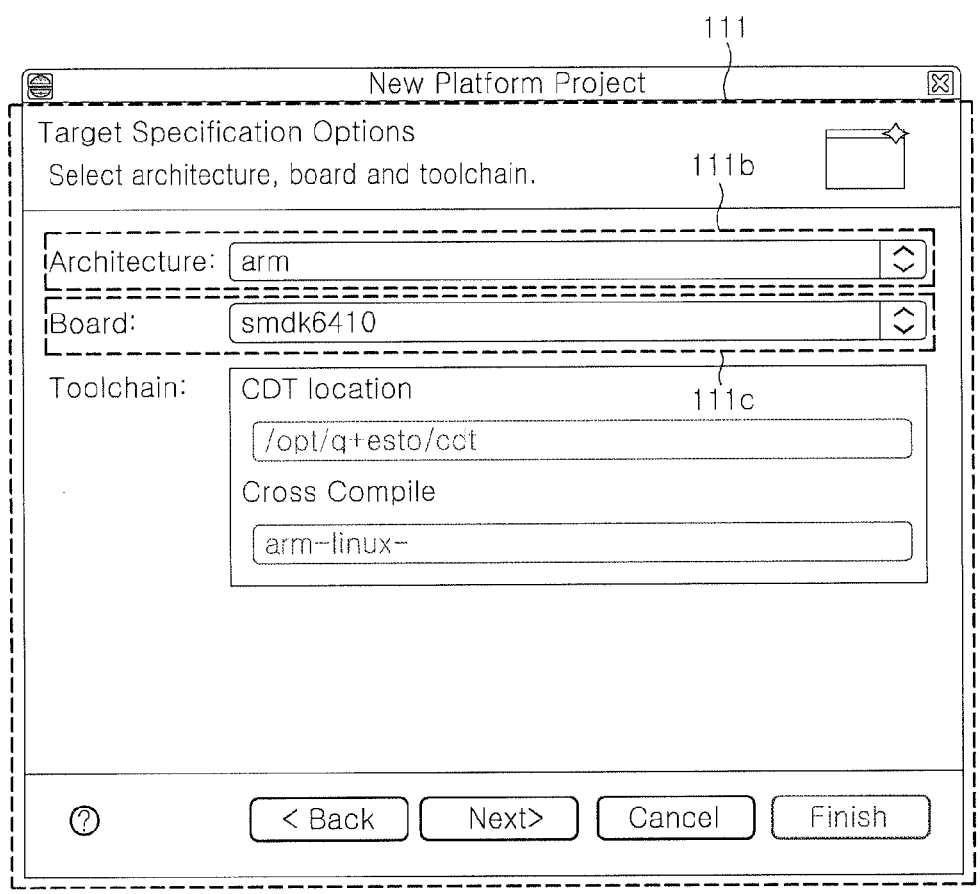
FIG. 9 is a diagram depicting a method of setting a target type according to an embodiment of the present invention.

FIG. 9 is a diagram depicting the method of setting a target type according to the embodiment of the present invention.

As shown in FIG. 9, the integrated project creation unit 111 may set the target type of a project property in accordance with a target characteristic, that is, an architecture and a board.

For example, the integrated project creation unit 111 sets an architecture 111b to "arm" and a board 111c to "smdk6410," and sets the target type of a project property in accordance with the architecture 111b and the board.

Next, a method for the integrated project creation unit of the integrated project management unit to set a development type according to an embodiment of the present invention will be described with reference to FIG. 10.

Figure 10:
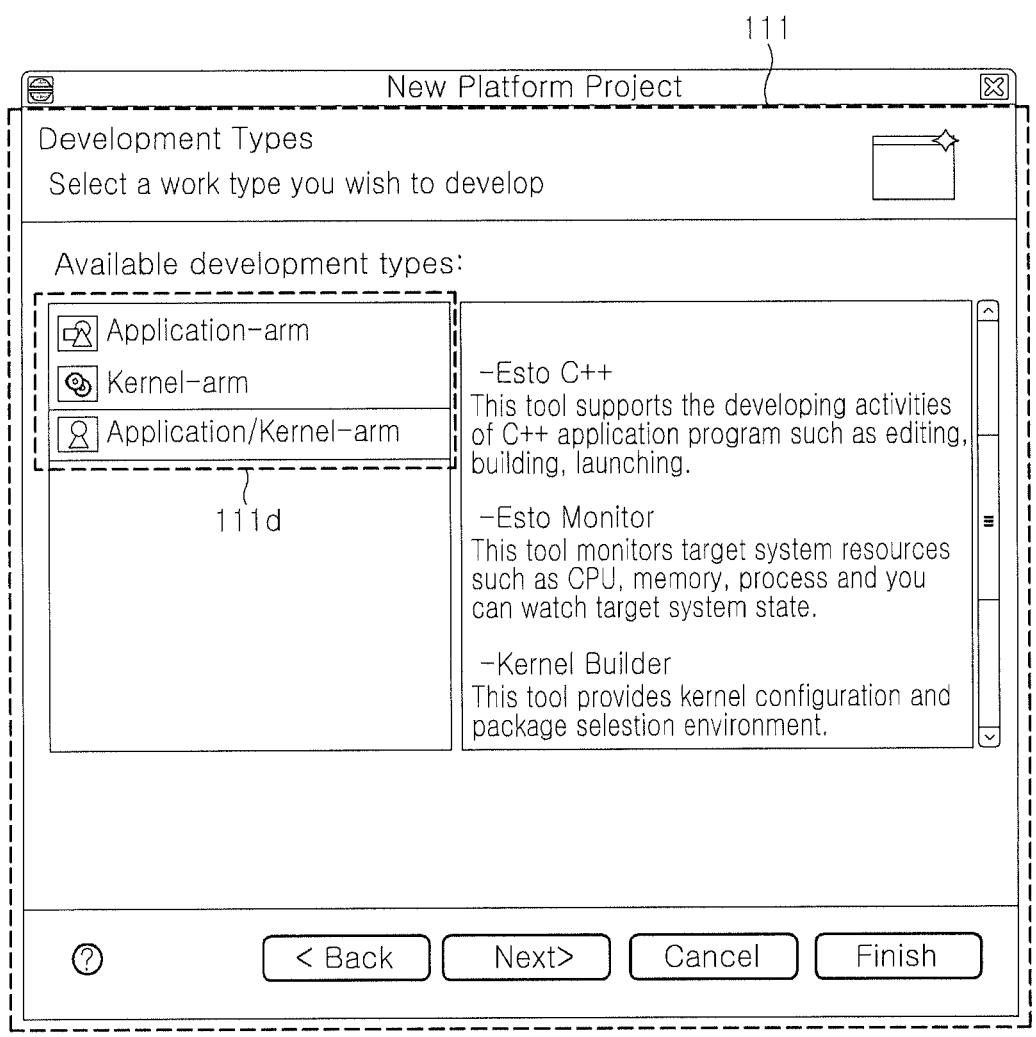
FIG. 10 is a diagram depicting a method of setting a development type according to an embodiment of the present invention.

FIG. 10 is a diagram depicting the method of setting a development type according to the embodiment of the present invention.

As shown in FIG. 10, the integrated project creation unit 111 may set a development type by selecting any one from among a plurality of development types corresponding to the preset target types of project properties.

For example, the integrated project creation unit 111 may select any one from among a plurality of development types 111d, that is, "Application-arm," "Kernel-arm," and "Application/Kernel-arm."

Next, a method for the integrated project creation unit of the integrated project management unit to create a subordinate project of an integrated project according to an embodiment of the present invention will be described with respect to FIG. 11.

Figure 11:
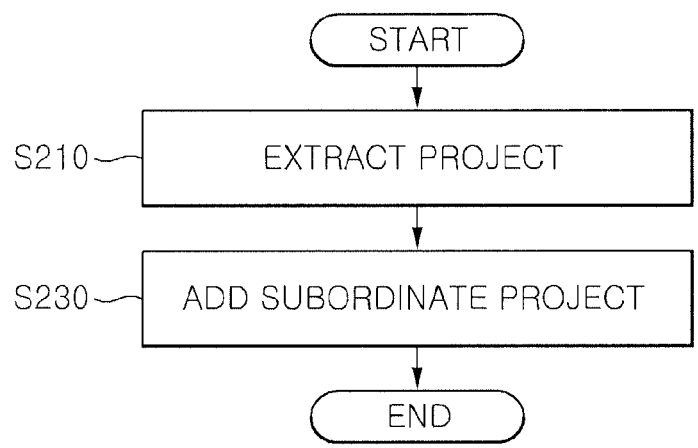
FIG. 11 is a diagram depicting a method of creating a subordinate project according to an embodiment of the present invention

FIG. 11 is a diagram depicting the method of creating a subordinate project according to the embodiment of the present invention.

As shown in FIG. 11, first, the integrated project creation unit 111 of the integrated project management unit 110 extracts a project, corresponding to the target type and application type of an integrated project, from among a plurality of projects previously created using a plurality of software development tools at step S210.

Thereafter, the integrated project creation unit 111 of the integrated project management unit 110 adds the extracted project as a subordinate project of the integrated project at step S230.

Next, a method for the integrated project creation unit of the integrated project management unit to add a subordinate project to an integrated project according to an embodiment of the present invention will be described with reference to FIG. 12.

Figure 12:
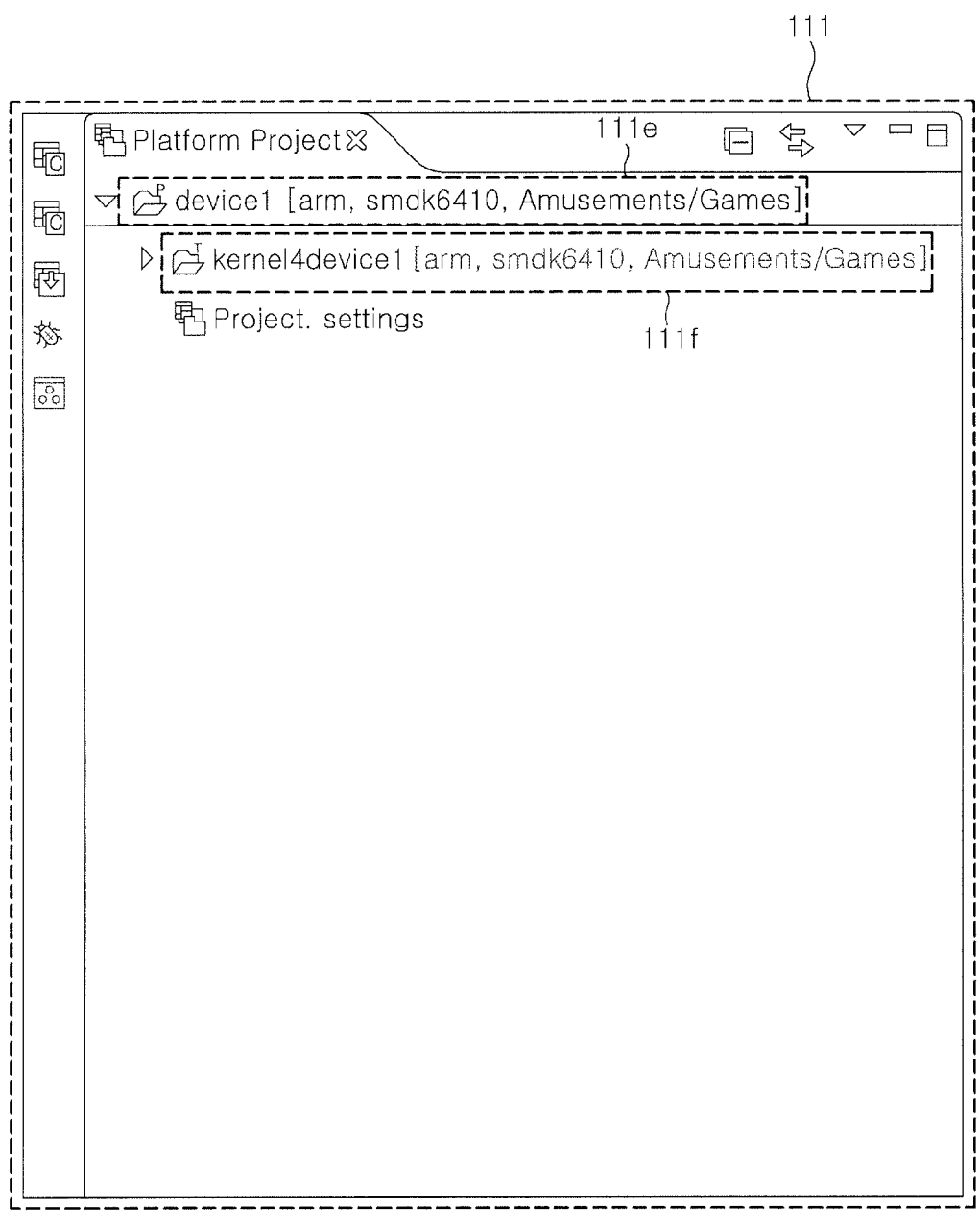
FIG. 12 is a diagram depicting a method of adding a subordinate project according to an embodiment of the present invention.

FIG. 12 is a diagram depicting the method of adding a subordinate project according to the embodiment of the present invention.

As shown in FIG. 12, the integrated project creation unit 111 may add a project corresponding to the target type and application type of an integrated project as a subordinate project of an integrated project.

For example, the integrated project creation unit 111 may add a subordinate project 111f, that is, "kernel4device1," to an integrated project 111e, that is, "device1." Here, the architecture, board and application type of the integrated project 111e and the subordinate project 111f are "arm," "smdk6410," and "Amusements/Games."

Next, a method for the integrated project creation unit of the integrated project management unit to create a subordinate project of an integrated project according to an embodiment of the present invention will be described with reference to FIG. 13.

Figure 13:
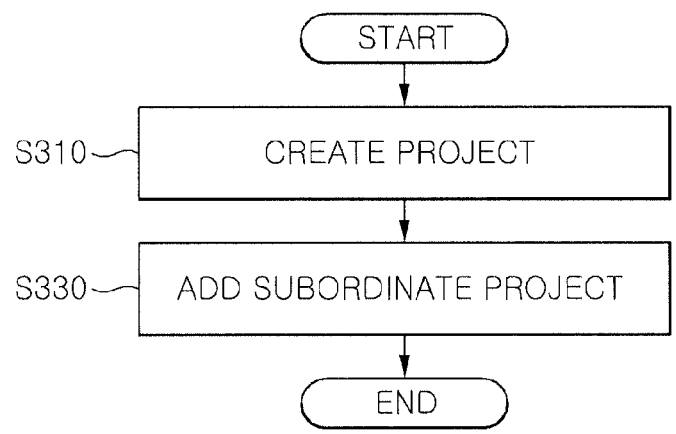
FIG. 13 is a diagram depicting another method of creating a subordinate project according to an embodiment of the present invention.

FIG. 13 is a diagram depicting the method of creating a subordinate project according to the embodiment of the present invention.

As shown in FIG. 13, first, the integrated project creation unit 111 of the integrated project management unit 110 creates the project of a software development tool corresponding to the development type of an integrated project at step S310. Here, the integrated project creation unit 111 of the integrated project management unit 110 may create the project of a software development tool that supports a target type corresponding to the development type of an integrated project.

Thereafter, the integrated project creation unit 111 of the integrated project management unit 110 adds the created project as a subordinate project of the integrated project at step S330. Here, the target type and application type of the integrated project are applied to the added subordinate project in the same manner.

The present invention has the advantage of improving the efficiency of the development of embedded software because an embedded software development environment can be reconstructed using software development tools which are suitable for the application and development types of embedded systems to be developed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of reconstructing an embedded software development environment, comprising:
   receiving a project property;
   receiving a development type corresponding to the project property, the development type selected from among a plurality of development types;
   creating with a processor an integrated project using the project property and the selected development type; and
   creating a subordinate project of the integrated project using a plurality of development tools,
   wherein the receiving the project property comprises:
   receiving an application type of the integrated project;
   receiving a target type of the integrated project;
   amending the development type for the target type;
   amending the application type for the integrated project; and
   reconstructing the embedded software development environment, wherein the receiving the target type comprises:
   receiving the target type corresponding to an architecture of an embedded system to which the embedded software will be applied, and
   wherein the receiving the development type comprises:
   receiving the development type corresponding to the target type, the development type selected from among the plurality of development types,
   wherein the creating the subordinate project comprises:
   extracting a project, corresponding to the project property, from among a plurality of projects previously created using the plurality of development tools; and
   adding the extracted project as the subordinate project of the integrated project.

2. The method as set forth in claim 1, wherein the receiving the application type comprises:
   receiving any one selected from among a plurality of predefined application types.

3. The method as set forth in claim 1, wherein the creating the integrated project comprises:
   creating the integrated project corresponding to the application type, the target type, and the development type selected by a user.

4. The method as set forth in claim 1, wherein the creating a subordinate project comprises:
   creating a project of the development tool, corresponding to the development type, which belongs to the plurality of development tools; and
   adding the created project as a subordinate project of the integrated project.

5. An apparatus for reconstructing an embedded software development environment having a memory coupled to a processor, comprising:
   an integrated management setter for setting at least one target supported by each of a plurality of development tools and registering the plurality of development tools using the processor; and
   an integrated project manager for creating an integrated project in which the embedded software development environment is reconstructed using the plurality of development tools,
   wherein the integrated project manager sets application and development types of the integrated project to create the integrated project corresponding to the application type and the development type, and
   wherein the integrated project manager sets a target type of the integrated project, sets a development type, corresponding to the target type, which belongs to a plurality of development types, as the development type,
   wherein the creating the integrated project comprises:
   amending the development type for the target type;
   amending the application type for the integrated project; and
   reconstructing the embedded software development environment,
   wherein the setting of the target type comprises:
   setting the target type corresponding to an architecture of an embedded system to which the embedded software will be applied,
   wherein the creating a subordinate project comprises:
   extracting a project, corresponding to the integrated project, from among a plurality of projects previously created using the plurality of development tools; and
   adding the extracted project as the subordinate project of the integrated project.

6. The apparatus as set forth in claim 5, wherein:
   the integrated management setter configures information about development tools supporting each of a plurality of target types, using information about target types supported by each of the plurality of development tools; and
   the integrated project manager extracts the development tool supporting the target type from among the plurality of development tools using the information about development tools supporting each of the plurality of target types, and creates the integrated project using the extracted development tool.

7. The apparatus as set forth in claim 5, further comprising an integrated tool manager for defining a plurality of application types and a plurality of development types.

8. The apparatus as set forth in claim 5, wherein the integrated project manager comprises a user interface for displaying the integrated project and providing an interface for the integrated project.

* * * * *